C. W. LIND.
SALT SHAKER.
APPLICATION FILED JUNE 22, 1907.
960,650.
Patented June 7, 1910.
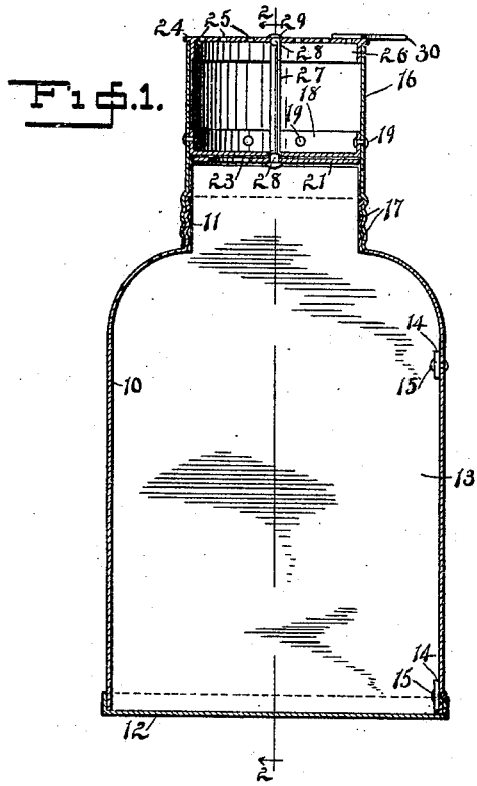
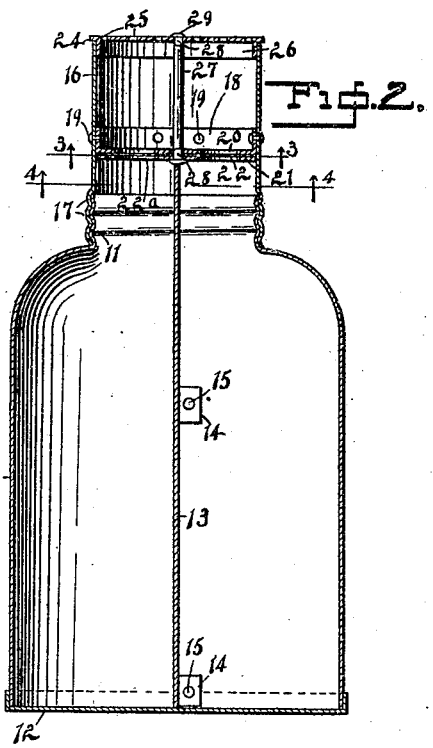
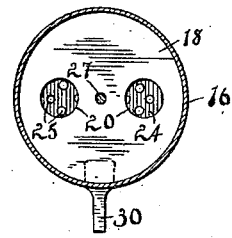
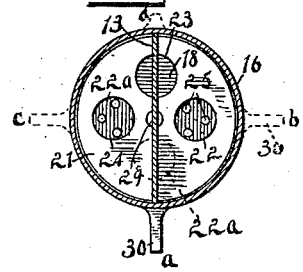
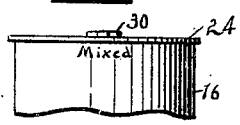
WITNESSES:
Mathew J. Marty
M. A. Milord
INVENTOR
Charles W. Lind
By Frederick Benjamin
ATT'Y.

UNITED STATES PATENT OFFICE.

CHARLES WM. LIND, OF McKEESPORT, PENNSYLVANIA.

SALT-SHAKER.

960,650.  Specification of Letters Patent.  Patented June 7, 1910.

Application filed June 22, 1907. Serial No. 380,202.

*To all whom it may concern:*

Be it known that I, CHARLES WM. LIND, a citizen of the United States, residing at McKeesport, in the county of Allegheny and State of Pennsylvania, have invented certain new and useful Improvements in Salt-Shakers, of which the following is a specification.

My invention relates to culinary appliances and has special reference to utensils for holding and dispensing small quantities of salt, pepper and like condiments.

The chief objects of my invention are to provide a container having two cells adapted to contain different substances, and furnished with means for removing desired quantities of a substance from one cell, at the same time preventing the escape of the contents of the other cell, and further to provide mechanism whereby desirable quantities of the contents of both cells may be dispensed simultaneously, thus causing the delivery of a mixture of the substances.

Other objects of my improvement are to supply operating means that will permit of a ready shifting of the adjusting devices, and to furnish indicators by means of which the user may quickly select the desired condiment.

Another object of my invention is to provide a single utensil for holding and delivering small quantities of condiments in common use so that the required substance will be ever ready and no delay will result as happens when several boxes are employed as is usually the case.

This combined salt and pepper box is especially useful to the housewife or chef during the process of cooking and has its special advantages when space is limited as in the kitchen of dining cars and restaurants.

I accomplish the above and other important objects by the employment of the device illustrated in the accompanying drawing which forms a part of this specification and in which:

Figure 1 is a vertical section of a combined salt and pepper box embodying my improvements, the plane of the section being parallel to the partition; Fig. 2 is a sectional view taken on the line 2—2 of Fig. 1; Figs. 3 and 4 are sectional views taken on the lines 3—3, 4—4, respectively, of Fig. 2, and Figs. 5, 6, and 7, are fragmentary views of the rotatable cap as seen from directions having an angular deviation from each other of 90 degrees.

Referring to the drawing in detail the numeral 10 indicates the body of a canister or container provided with a neck 11 and supplied with a bottom piece 12 having an upturned margin forming an annular flange to receive the said body the two pieces being securely joined by soldering, if of metal, which is the construction I have shown or in any other manner desired. The body 10 is subdivided by a thin partition 13 into two compartments or cells, the said portion being furnished with extensions or ears 14, bent at a right angle with the plane of the partition and secured to the body walls by means of rivets 15, thus forming a powder proof wall between the two cells.

A cylindrical cap 16 is provided at one end with threads 17 which engage similar threads formed in the neck 11 of the body. About midway between the ends said cap is provided internally with a horizontal plate or diaphragm 18 having a flanged margin secured to the said cap by rivets 19. The plate 18 is furnished with two apertures diametrically opposite each other, and immediately beneath said plate 18 and in apposition therewith is located a disk 21 its area being co-extensive with that of the interior of said cap. The disk is supplied with three apertures, two apertures 22, 22ª, being placed diametrically opposite to one another, and at 90 degrees from said apertures is the third opening 23. These apertures as well as the apertures 20 in the plate 18 are approximately of equal size, and are placed at the same distance, radially, from the axial line of the said cap 16. The latter is supplied with a cover 24 furnished with a series of holes 25 of suitable size to permit the powdered or granulated substances to sift therethrough in the desired quantities during inversion of the receptacle as hereinafter described. The said cover has a flange 26 which fits snugly within the cap and may be turned therein. The said disk 21 is supported in its position against the under face of the plate 18 by means of a rod or rivet 27, axially located, and passing through a hole in the center of said plate in which it is adapted to rotate. The ends of the rivet 27 pass through the cover 24 and the disk 21, the body of the rivet being squared, as indicated by 28 where it pierces said cover and disk so that the disk and cover will turn in unison the protruding extremities 29 being headed to secure the parts when assembled.

To the outside of the cover 24 is soldered or riveted a handle 30 the end of which projects beyond the cover margin to afford a convenient means for rotating the said cover, and attached disk.

To fill the receptacle the cap 16 is unscrewed from the neck 11 and the substances which are usually salt and pepper are placed one variety in each cell and the cap screwed in place.

To use the device, the cover is turned by means of the handle 30 until the required apertures register so as to permit the desired substance from one of the cells, or an admixture from both cells at once to flow out. The said cap is provided with the proper indicating words as hereinbefore mentioned, such words being shown in Figs. 5, 6 and 7. Inspection will show that when the plate 18 is in the position illustrated in Fig. 3 and the disk 21 in that seen in Fig. 4, the apertures 22, 22$^a$, in the disk will register with the openings 20 of the plate 18, the handle being at $a$, and if the receptacle is inverted a mixture from both cells will be delivered through the perforated cover. If, now, the handle is given a quarter turn to the position $b$ shown in dotted lines in Fig. 4, the hole 22 will pass to the position of the aperture 23, the latter will occupy the place of the hole 22$^a$, said hole 22$^a$ being at the dotted position shown, and the contents of only one cell will be allowed to escape through the opening 23 which occupies, as stated, the position formerly occupied by the opening 22$^a$; the aperture 20 of the opposite cell being closed by the blank portion of the said disk diametrically opposite to the opening 23. To open the opposite cell the handle is now given a half turn to the position $c$, and when the handle is turned to an intermediate position $d$ both cells will again be open.

It will be noted that at any position of the parts illustrated some one of the three openings 22, 22$^a$, 23, is half way across the top of the partition 13, and it might appear that this would permit the passage of the condiments from one compartment across the partition into the other compartment. No appreciable admixture of the contents of the cells in this manner can take place since the sheet metal entering into the construction of the device, and particularly the disks, will be comparatively thin and as the disks are in apposition the said passage will be correspondingly narrow.

Having thus described my improvements, what I claim as new, is:—

1. The combination of a receptacle provided with two compartments, a cap removably attached to said body, a perforated rotatable cover for said cap, a fixed diaphragm in the cap spaced from the cover and having two apertures placed diametrically one over each compartment, a rotatable disk below said diaphragm and provided with three openings adapted to register with said apertures when the disk is rotated, and a post passing loosely through said diaphragm and fixed at its ends to the cover and disk.

2. In a condiment holder the combination of a body portion provided with two compartments, a removable cap, a perforated rotatable cover for the cap, a diaphragm fixed in the cap and having two apertures placed diametrically one over each compartment, a rotatable disk below and in apposition with said diaphragm and furnished with three openings, adapted to register with said apertures when the disk is rotated, a post passing through said diaphragm and having squared ends engaging sockets in the cover and disk and means for indicating the position of the disk relatively to the diaphragm.

In testimony whereof I affix my signature in the presence of two witnesses.

CHARLES WM. LIND.

Witnesses:
 EMMA NYSTROM,
 SINGE BRAMAN.